(12) United States Patent
Wang

(10) Patent No.: US 7,534,108 B1
(45) Date of Patent: May 19, 2009

(54) PARKING ALARM OF A TOWING CONNECTOR

(76) Inventor: Jen-Ching Wang, No. 14-1, Lane 199, San Chun Street, Shu Lin City, Taipei Hsien (TW)

( * ) Notice: Subject to any disclaimer, the term of this patent is extended or adjusted under 35 U.S.C. 154(b) by 0 days.

(21) Appl. No.: 11/797,099

(22) Filed: Apr. 30, 2007

(51) Int. Cl.
H01R 33/00 (2006.01)
(52) U.S. Cl. ........................................ 439/35
(58) Field of Classification Search ............... 439/35, 439/489, 490, 340
See application file for complete search history.

(56) References Cited

U.S. PATENT DOCUMENTS

| | | | | |
|---|---|---|---|---|
| 4,127,855 A * | 11/1978 | Toner | ................ | 340/687 |
| 4,278,962 A * | 7/1981 | Lin | ................ | 340/904 |
| 4,390,226 A * | 6/1983 | Hohn | ................ | 439/261 |
| 4,781,393 A * | 11/1988 | Jeter | ................ | 307/10.1 |
| 4,945,346 A * | 7/1990 | Schmiemann | ................ | 340/656 |
| 5,281,147 A * | 1/1994 | Hughes | ................ | 439/35 |
| 5,514,009 A * | 5/1996 | Hughes | ................ | 439/35 |
| 5,765,848 A * | 6/1998 | Silvey | ................ | 280/422 |
| 6,054,779 A * | 4/2000 | Zubko | ................ | 307/10.8 |
| 6,064,299 A * | 5/2000 | Lesesky et al. | ................ | 340/431 |
| 6,305,945 B1 * | 10/2001 | Vance | ................ | 439/35 |
| 6,329,927 B1 * | 12/2001 | Hobson | ................ | 340/815.69 |
| 6,364,681 B1 * | 4/2002 | Watanabe | ................ | 439/335 |
| 6,390,824 B1 * | 5/2002 | Vance | ................ | 439/35 |
| 6,422,884 B1 * | 7/2002 | Babasick et al. | ................ | 439/222 |
| 6,447,302 B1 * | 9/2002 | Davis | ................ | 439/34 |
| 6,475,036 B2 * | 11/2002 | Morikawa | ................ | 439/716 |
| D468,691 S * | 1/2003 | Detter et al. | ................ | D13/133 |
| 6,535,113 B1 * | 3/2003 | Gravolin | ................ | 340/431 |
| 6,642,628 B2 * | 11/2003 | Burdick et al. | ................ | 307/9.1 |
| 6,657,435 B2 * | 12/2003 | Brown | ................ | 324/508 |
| 6,695,621 B1 * | 2/2004 | Wang | ................ | 439/35 |
| 6,709,275 B1 * | 3/2004 | Ihde | ................ | 439/35 |
| 6,749,438 B1 * | 6/2004 | Scheller et al. | ................ | 439/35 |
| 6,788,190 B2 * | 9/2004 | Bishop | ................ | 340/435 |
| 6,980,096 B1 * | 12/2005 | Washington et al. | ................ | 340/431 |
| 7,118,379 B1 * | 10/2006 | Wang | ................ | 439/35 |
| 7,214,094 B2 * | 5/2007 | Kaminski et al. | ................ | 439/550 |
| 7,324,013 B2 * | 1/2008 | Esson | ................ | 340/903 |
| 7,331,792 B2 * | 2/2008 | Cummings et al. | ................ | 439/35 |
| 2002/0004343 A1 * | 1/2002 | Morikawa | ................ | 439/716 |
| 2002/0075622 A1 * | 6/2002 | Robinson | ................ | 361/117 |
| 2002/0125771 A1 * | 9/2002 | Kaminski | ................ | 307/10.1 |
| 2005/0037632 A1 * | 2/2005 | Ihde | ................ | 439/35 |
| 2007/0171031 A1 * | 7/2007 | Hastings | ................ | 340/431 |
| 2007/0202711 A1 * | 8/2007 | Dilgard | ................ | 439/35 |

* cited by examiner

Primary Examiner—Hae Moon Hyeon
Assistant Examiner—Vladimir Imas
(74) Attorney, Agent, or Firm—Troxell Law Office, PLLC

(57) ABSTRACT

A parking alarm of a towing connector having a buzzer mounted in the housing thereof and electrically connected with the positive terminal and negative terminal of the buzzer to the terminal for parking light and grounding terminal of the male connector at one end of the housing such that the buzzer is electrically to produce an audio warning signal when the parking light is turned on during a backward movement of the truck and the trailer.

2 Claims, 7 Drawing Sheets

PARKING ALARM OF A TOWING CONNECTOR

BACKGROUND AND SUMMARY OF THE INVENTION

The present invention relates to a towing connector and more particularly, to a parking alarm of a towing connector, which gives an audio warning signal when the trailer is moving backwards with the towing truck.

A regular towing connector 9 for connection between a towing truck and a trailer, as shown in FIGS. 1 and 2, is comprised of a male connector 91 and a female connector 92. During a backward movement of the trailer with the towing truck, the parking light is turned on to give a visual warning signal. However, a visual warning signal is insufficient to eliminate potential accident. Warning sound is necessary during a parking mode.

The present invention has been accomplished under the circumstances in view. It is therefore one object of the present invention to provide a towing connector, which gives a warning sound during parking of the vehicle.

To achieve this and other objects of the present invention, the towing connector comprises a housing, a male connector mounted in one end of the housing for connection to the female connector at the towing truck, a female connector mounted in the other end of the housing for connection to the male connector at the trailer, and a buzzer mounted inside the housing and electrically connected to the positive and negative terminals thereof to thee terminal for parking light and grounding terminal of the male connector. When the trailer is moved backwards with the towing truck, the parking light is turned on to give a visual warning signal, and at the same time the buzzer is turned on to give an audio warning signal.

DETAILED DESCRIPTION OF THE INVENTION

Referring to FIGS. 3-7, a towing connector in accordance with the present invention is shown comprising a housing 1, a female connector 2, a male connector 3, and a buzzer 6.

Figure 1:
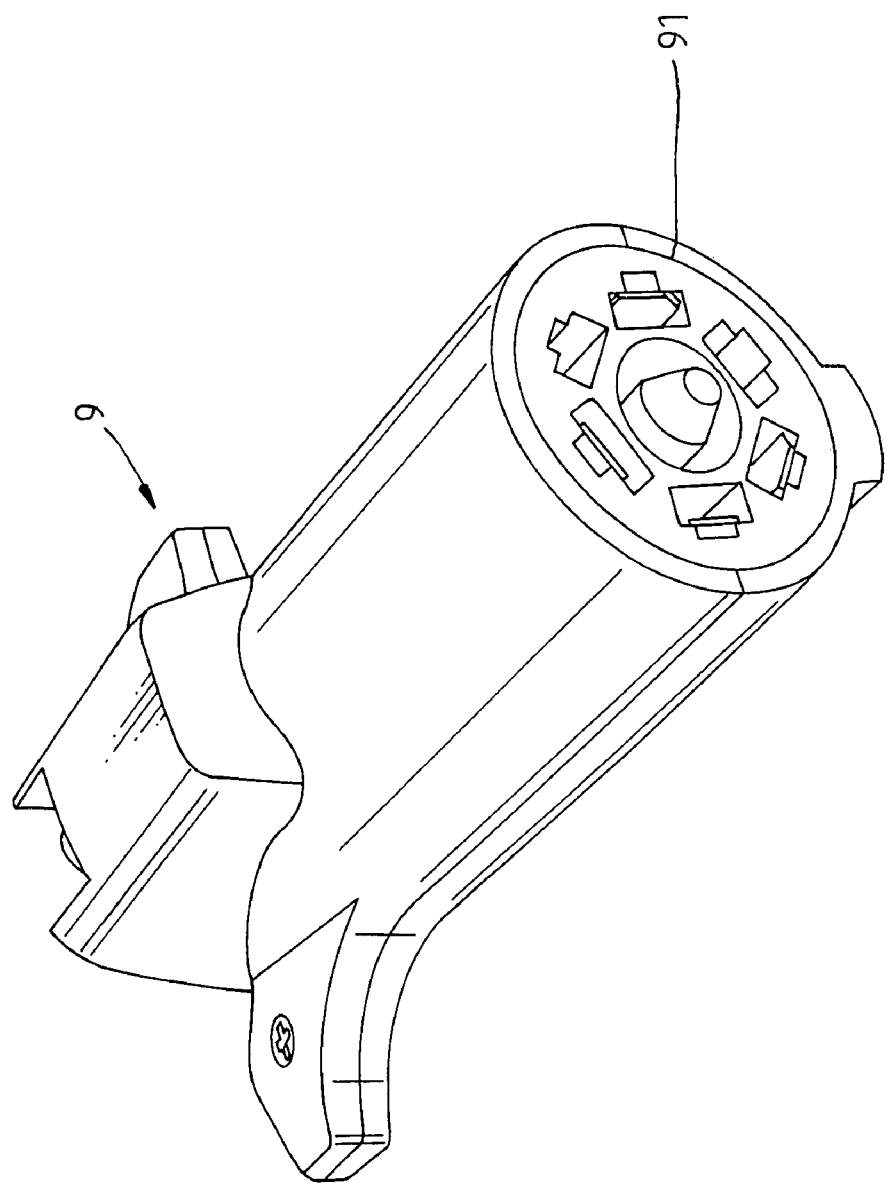
FIG. 1 is an oblique elevation of a towing connector according to the prior art.
Figure 2:
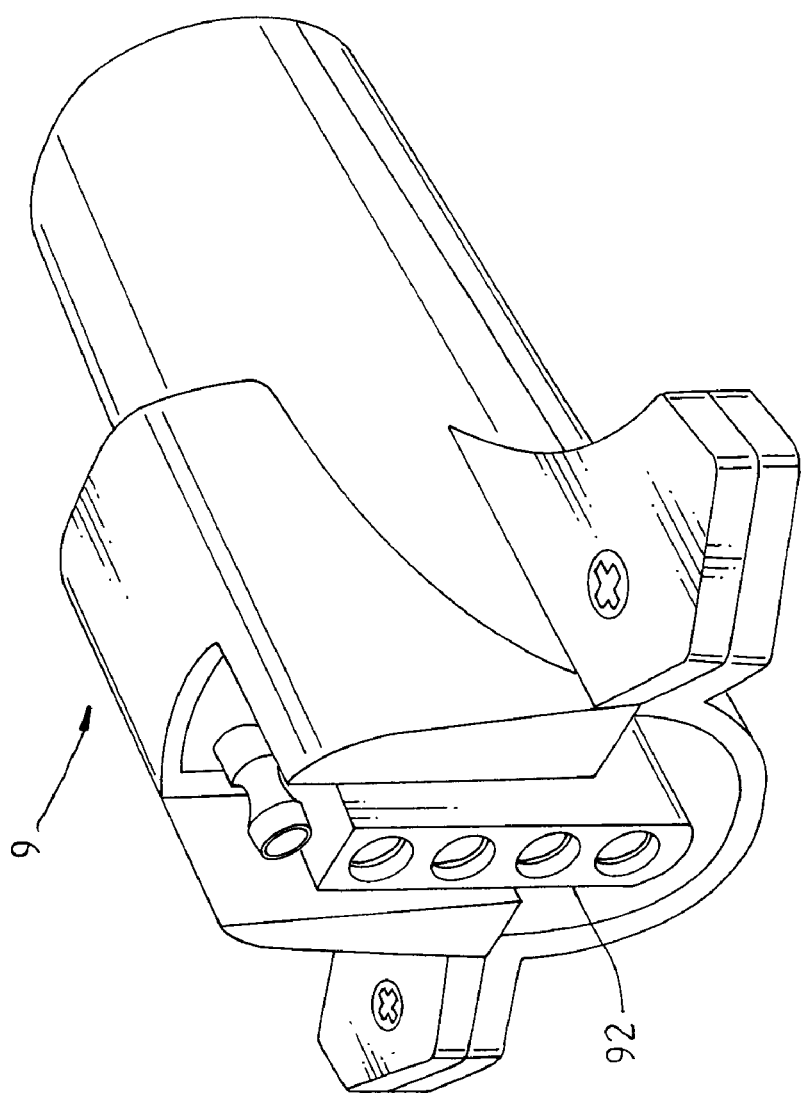
FIG. 2 is an oblique elevation of the prior art towing connector when viewed from another angle.
Figure 3:
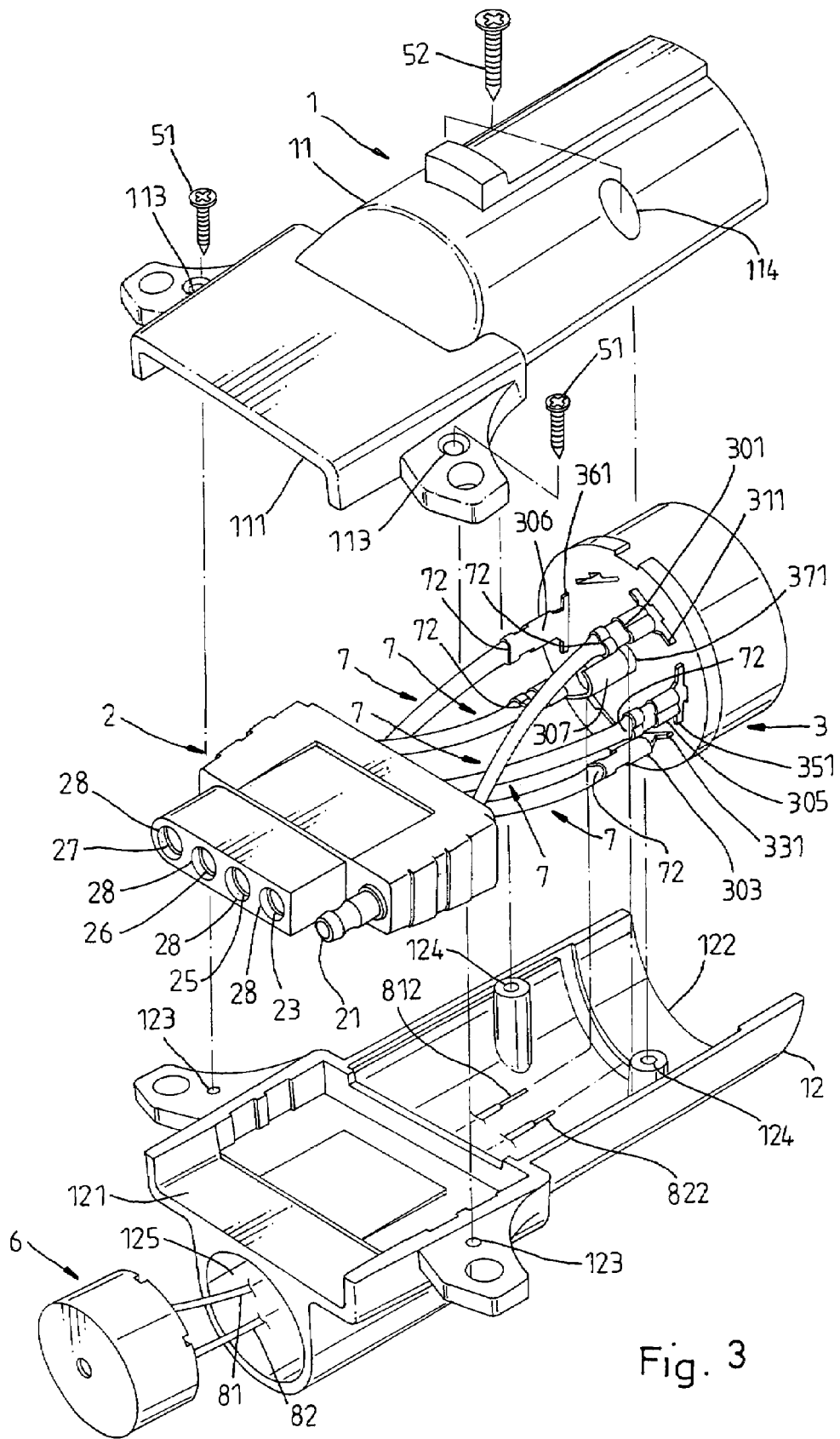
FIG. 3 is an exploded view of a towing connector according to the present invention.
Figure 4:
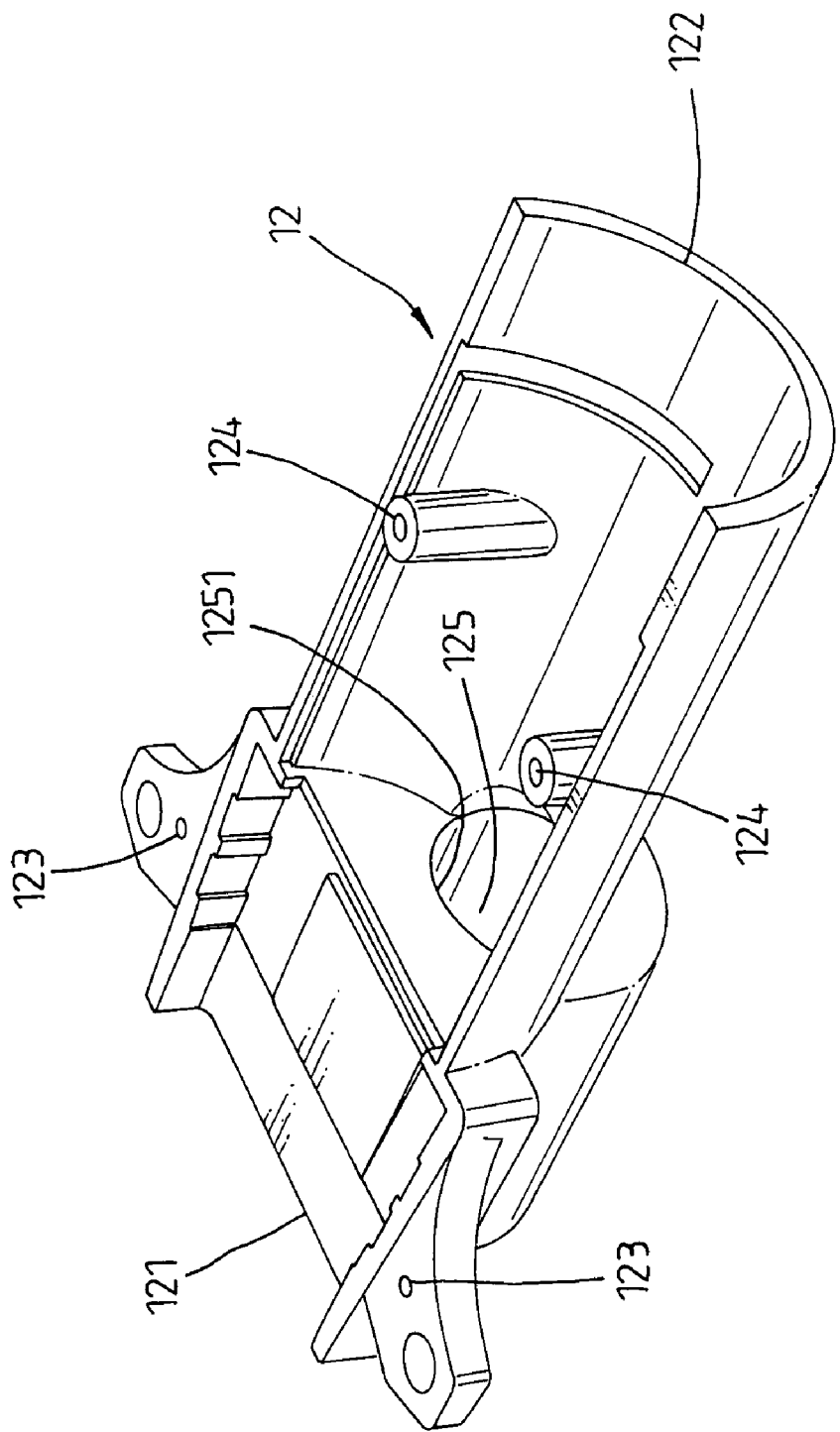
FIG. 4 is an oblique elevation of a part of the present invention, showing the structure of the second cover shell of the housing.
Figure 5:
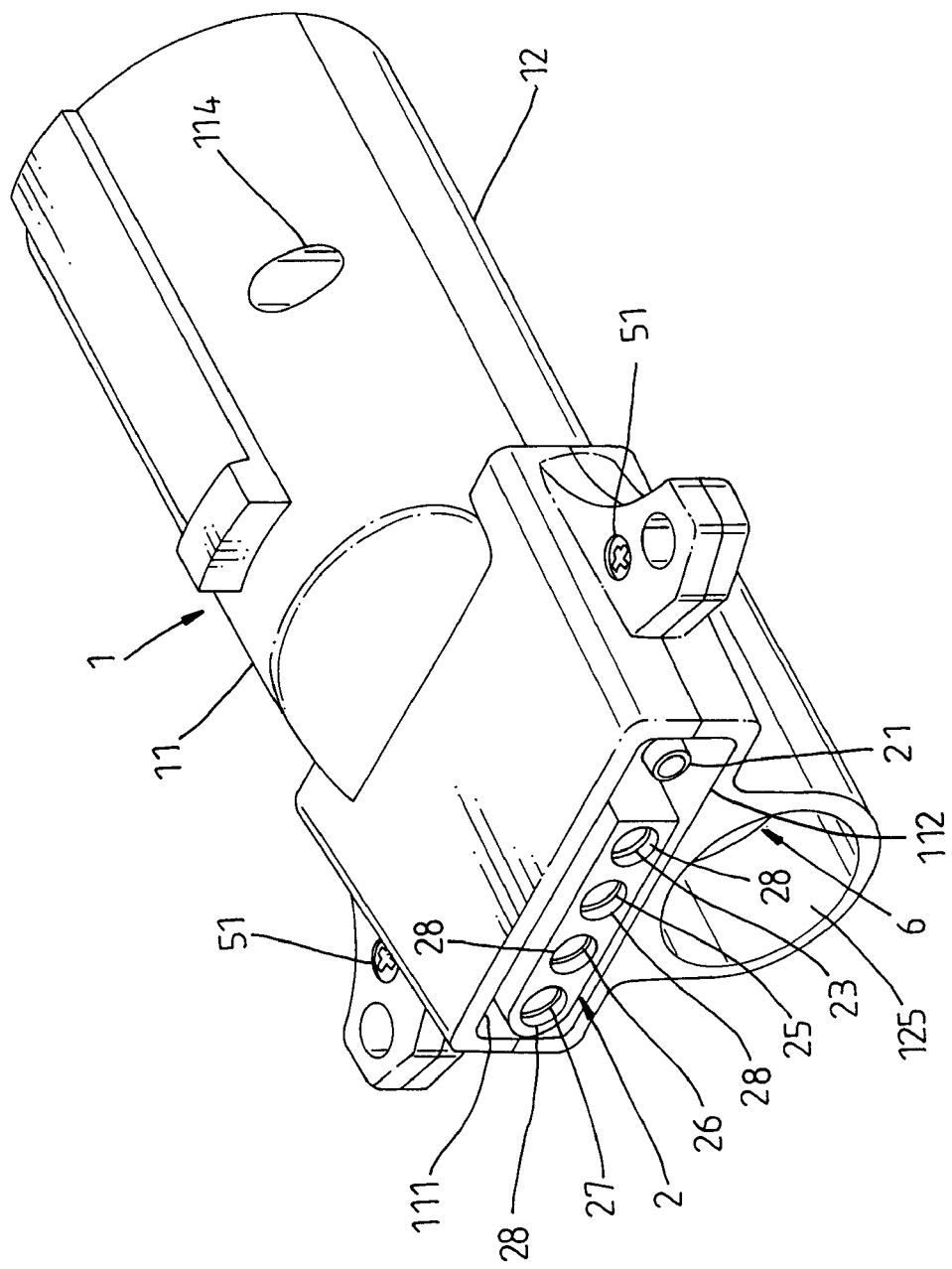
FIG. 5 is an oblique elevation of the towing connector according to the present invention.
Figure 6:
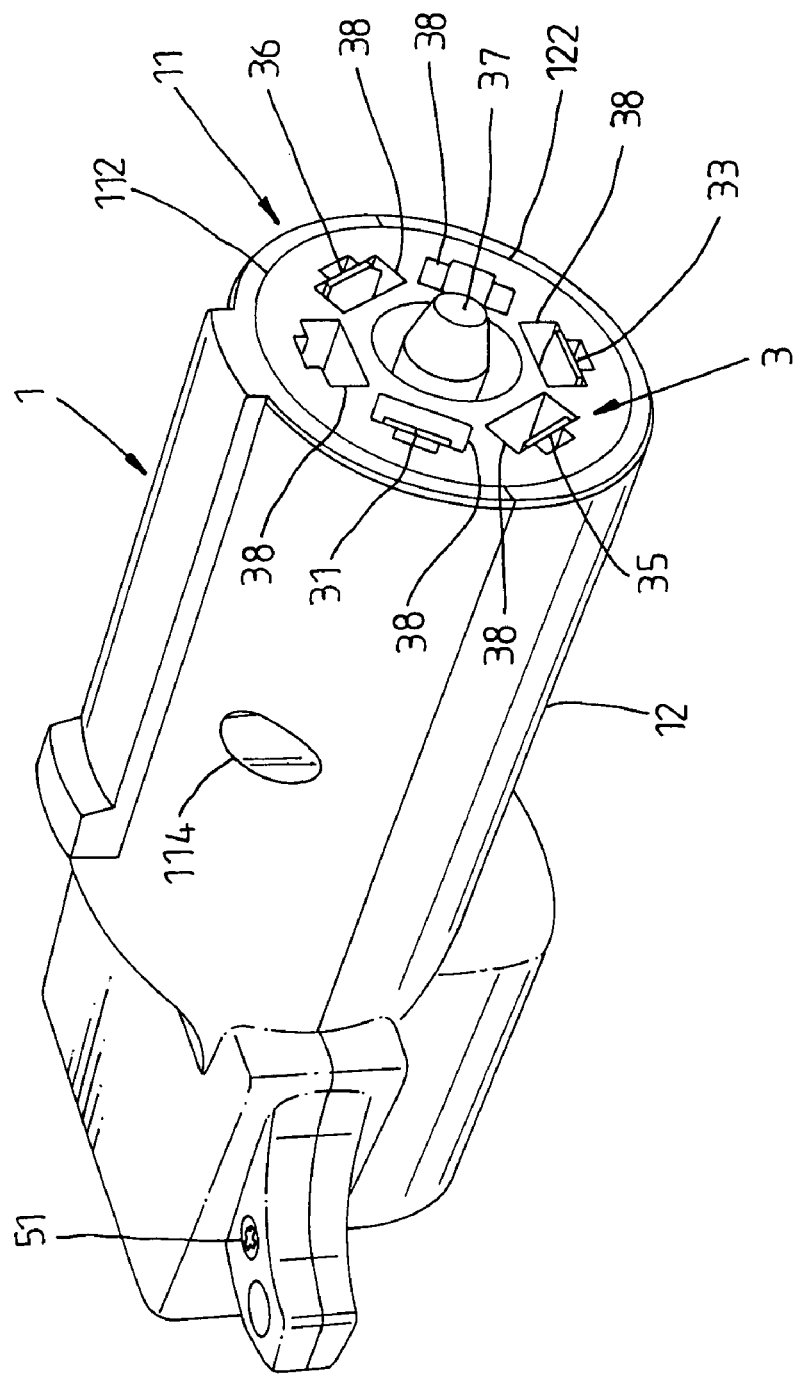
FIG. 6 is another oblique elevation of the towing connector according to the present invention when viewed from another angle.
Figure 7:
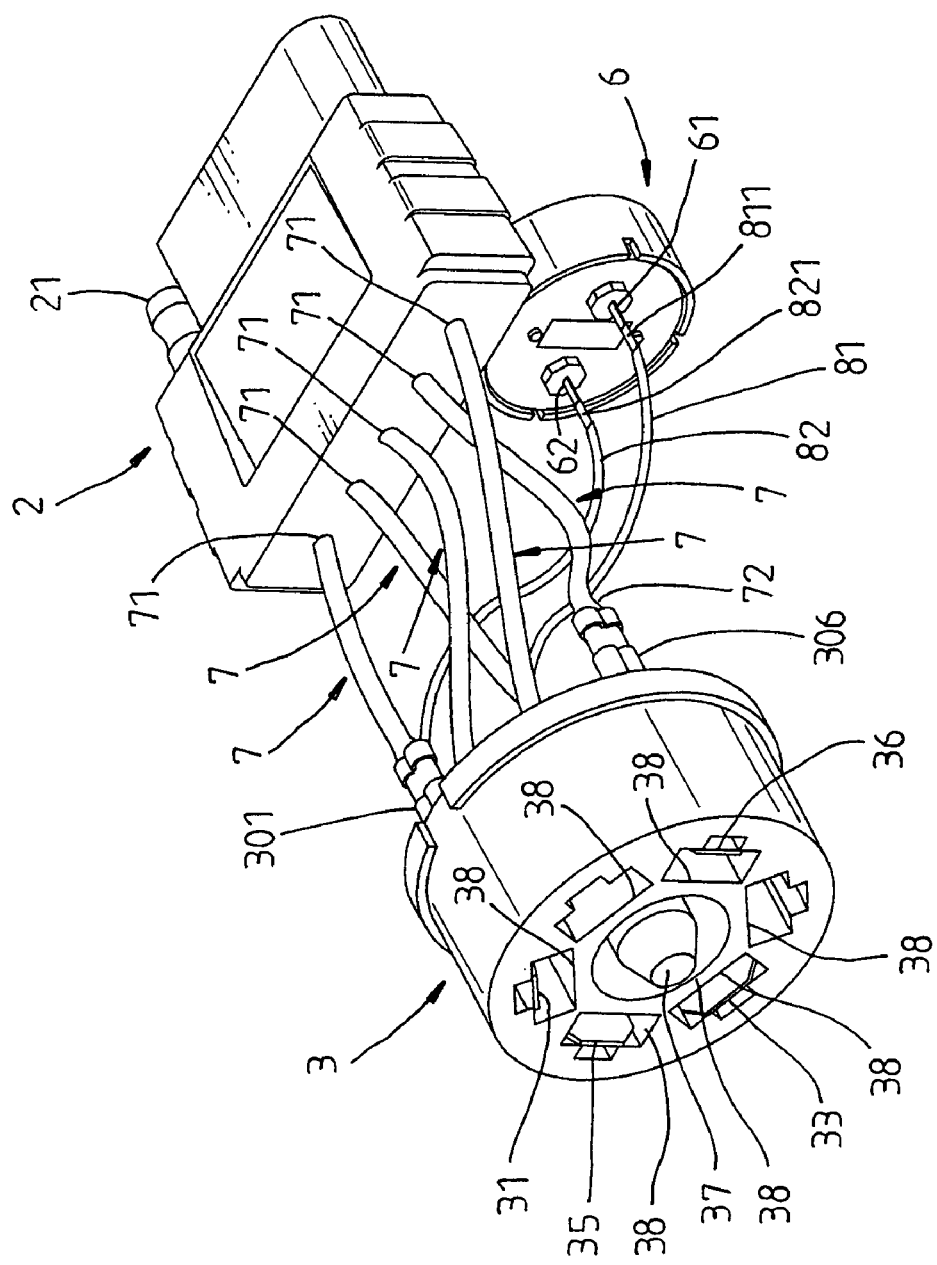
FIG. 7 is an elevational assembly view of the female connector, electric wires, male connector, and buzzer of the towing connector according to the present invention.

The housing 1 is comprised of a first cover shell 11 and a second cover shell 12. The first cover shell 11 and the second cover shell 12 each have a front locating groove 111 or 121, and a rear locating groove 112 or 122 (see FIGS. 2 and 6) for accommodating the female connector 2 and the male connector 3, and a plurality of mounting holes 113 and 114, or 123 and 124. Fastening members 51 and 52 are fastened to the mounting holes 113 and 114 of the first cover shell 11 and the mounting holes 123 and 124 of the second cover shell 12 to fasten the first cover shell 11 and the second cover shell 12 together, securing the female connector 2 and the male connector 3 to the front and rear sides of the housing 1. The second cover shell 12 further has an accommodation chamber 125 for accommodating the buzzer 6. The inner side 1251 of the second cover shell 12 is in communication with the rear locating groove 122 of the second cover shell 12 (see FIG. 4).

The female connector 2 is fixedly mounted in the front locating groove 111 of the first cover shell 11 and the front locating groove 121 of the second cover shell 12, having a grounding terminal 21, a plurality of terminal holes 28 spaced from one another for accommodating a terminal for tail light 23, a terminal for left directional light 25, a terminal for right directional light 26, and a terminal for parking light 27 respectively. First ends 71 of electric wires 7 are respectively connected to the grounding terminal 21, the terminal for tail light 23, the terminal for left directional light 25, the terminal for right directional light 26, and the terminal for parking light 27 respectively (see FIGS. 3 and 7).

The male connector 3 is fixedly mounted in the rear locating groove 112 of the first cover shell 11 and the rear locating groove 122 of the second cover shell 12, having a plurality of mounting holes 38 for accommodating a grounding terminal 31, a terminal for tail light 33, a terminal for left directional light 35, a terminal for right directional light 36, and a terminal for parking light 37 respectively. Second ends 72 of the aforesaid electric wires 7 are respectively connected to the inner end 311 of the grounding terminal 31, the inner end 331 of the terminal for tail light 33, the inner end 351 of the terminal for left directional light 35, the inner end 361 of the terminal for right directional light 36, and the inner end 371 of the terminal for parking light 37 by a respective terminal clamp 301, 303, 305, 306 or 307 (see FIGS. 3 and 7).

Referring to FIGS. 3 and 7 again, the buzzer 6 has its positive terminal 61 connected to one end 811 of an electric wire 81. The other end 812 of the electric wire 81 is connected to the inner end 371 of the terminal for parking light 37 by the associating terminal clamp 307. Further, the buzzer 6 has its negative terminal 62 connected to one end 821 of an electric wire 82. The other end 822 of the electric wire 82 is connected to the inner end 311 of the grounding terminal 31 of the male connector 3 by the associating terminal clamp 301.

During application, the male connector 3 is connected to the female connector at the towing truck (not shown), and the female connector 2 is connected to the male connector at the trailer (not shown). When the towing truck is moving the trailer backwards, the parking light is turned on to give a visual warning signal, and the buzzer 6 is simultaneously turned on to give an audio warning signal, assuring high safety.

As indicated above, the towing connector according to the invention has a buzzer 6 mounted in the housing 1 with the positive terminal 61 and. negative terminal 62 of the buzzer 6 respectively connected to the terminal for parking light 37 and grounding terminal 31 of the male connector 3. Therefore, when the towing truck is moving the trailer backwards, the parking light is turned on to give a visual warning signal, and the buzzer 6 is simultaneously turned on to give an audio warning signal, assuring high safety.

What is claimed is:

1. A parking alarm of a towing connector comprising:
   a housing, said housing having an accommodation chamber located on a first end thereof for accommodating a buzzer;

a female connector fixedly mounted in the first one end of said housing, said female connector comprising a grounding terminal, a plurality of terminal holes, and a plurality of terminals including a terminal for tail light, a terminal for left directional light, a terminal for right directional light and a terminal for parking light respectively mounted in the terminal holes of said female connector;

a male connector fixedly mounted in a second end of said housing remote from said female connector, said male connector comprising a plurality of terminal holes and a plurality of terminals including a grounding terminal, a terminal for tail light, a terminal for left directional light, a terminal for right directional light, and a terminal for parking light respectively mounted in the terminal holes of said male connector; and said buzzer having a positive terminal electrically connected to the terminal for parking light of said male connector by a first electric wire and a negative terminal electrically connected to the grounding terminal of said male connector by a second electric wire, wherein the female connector and the buzzer are located in the first end of the housing and the male connector is located in a second end of the housing, wherein said housing comprises a first cover shell, a second over shell, and a plurality of fastening members fastened to said first cover shell and said second cover shell to fixedly secure said first cover shell and said second cover shell together, said first cover shell and said second cover shell each having a front locating groove and a rear locating groove for accommodating said female connector and said male connector, wherein the accommodation chamber is located in a front end of the second cover shell.

2. The parking alarm of a towing connector as claimed in claim 1, further comprising a plurality of terminal electric wires, said terminal electric wires each having a first end respectively electrically connected to the grounding terminal, terminal for tail light, terminal for left directional light, terminal for right directional light and terminal for parking light of said female connector that is positioned in the front locating grooves of said first cover shell and said second cover shell and a second end respectively electrically connected to the grounding terminal, terminal for tail light, terminal for left directional light, terminal for right directional light and terminal for parking light of said male connector that is positioned in the rear locating grooves of said first cover shell and said second cover shell.

* * * * *